(12) United States Patent
Tanaka et al.

(10) Patent No.: US 6,897,938 B2
(45) Date of Patent: May 24, 2005

(54) POSITION MEASURING METHOD AND APPARATUS

(75) Inventors: Hiroshi Tanaka, Tochigi (JP);
Michihiro Hirooka, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/124,419

(22) Filed: Apr. 18, 2002

(65) Prior Publication Data

US 2002/0154283 A1 Oct. 24, 2002

(30) Foreign Application Priority Data

Apr. 18, 2001 (JP) .................................... 2001-119475

(51) Int. Cl.[7] .................... G03B 27/42; G03B 27/52; G01B 11/00
(52) U.S. Cl. .................... 355/53; 355/55; 356/401
(58) Field of Search ........................ 355/52–53, 55, 355/67–71, 77; 356/399–401; 250/548

(56) References Cited

U.S. PATENT DOCUMENTS

| | | | | |
|---|---|---|---|---|
| 4,390,279 A | * | 6/1983 | Suwa | 356/401 |
| 4,470,676 A | * | 9/1984 | Kinoshita et al. | 396/93 |
| 5,141,321 A | | 8/1992 | Tsuruoka | 356/400 |
| 5,249,016 A | | 9/1993 | Tanaka | 355/53 |
| 5,309,197 A | * | 5/1994 | Mori et al. | 355/53 |
| 5,347,118 A | * | 9/1994 | Iwanaga | 250/205 |
| 5,827,629 A | * | 10/1998 | Miyatake | 430/30 |
| 5,929,978 A | * | 7/1999 | Masaki | 355/53 |
| 6,011,612 A | * | 1/2000 | Go et al. | 355/69 |
| 6,097,495 A | * | 8/2000 | Uzawa et al. | 356/401 |
| 6,151,121 A | * | 11/2000 | Mishima | 356/399 |
| 6,285,033 B1 | * | 9/2001 | Matsumoto | 250/548 |
| 6,384,898 B1 | * | 5/2002 | Inoue et al. | 355/53 |

* cited by examiner

Primary Examiner—Henry Hung Nguyen
(74) Attorney, Agent, or Firm—Fitzpatrick, Cella, Harper & Scinto

(57) ABSTRACT

A position measuring apparatus which measures positions of first and second marks. The apparatus includes a detection system which detects an image of the first and second marks, an image processing system which processes the image of the first and second marks, and control system which controls the detection system and the image processing system so that at least two images, of which signal intensities are adjusted with respect to the first and second marks, respectively, are obtained.

36 Claims, 14 Drawing Sheets

FIG. 10

```
URL  http://www.maintain.co.jp/db/input.html

MALFUNCTION DATABASE INPUT SCREEN

DATE OF OCCURRENCE  [2000/3/15]  ~404
MODEL  [* * * * * * * * *]  ~401
SUBJECT MATTER  [OPERATING MALFUNCTION (ERROR AT BOOTING)]  ~403
EQUIPMENT SERIAL NO.  [465NS4580001]  ~402
DEGREE OF URGENCY  [D]  ~405
CONDITION  [LED CONTINUES FLASHING AFTER
            POWER IS TURNED ON]  ~406

COUNTERMEASURE  [POWER TURNED ON AGAIN
METHOD           (RED BUTTON PUSHED AT START UP)]  ~407

PROGRESS  [TEMPORARY MEASURES COMPLETED]  ~408
REPORT

[SEND] [RESET]    410              411                412
              LINK TO DATABASE OF RESULTS  SOFTWARE LIBRARY  OPERATING GUIDE
```

POSITION MEASURING METHOD AND APPARATUS

FIELD OF THE INVENTION

This invention relates to a position measuring method and apparatus used when positioning a substrate such as a wafer in a semiconductor exposure apparatus.

BACKGROUND OF THE INVENTION

A variety of systems has been proposed and put into effect regarding the aligning of a reticle and a substrate such as a wafer in an exposure apparatus.

In the case of a TTR (Through The Reticle) system, a reticle is irradiated from above with an illuminating light source (e.g., laser light) for alignment, reflected light from a reticle fiducial mark (referred to as a "reticle mark" below) on a reticle or reticle stage and a stage fiducial mark (referred to as a "stage mark" below) on a wafer or wafer stage is detected by an optoelectronic detector, and the centers of the mark patterns, for example, are found from the images, thereby detecting a relative positional deviation between the wafer stage and reticle stage.

Reference will be had to FIG. 1 to describe this prior art arrangement in simple terms. Light from an optical source in an illuminating system 14 illuminates a mark 16, which is of the kind shown in FIG. 2A, on a reticle 2 through a half-mirror 17, a mirror 8 and the reticle 2. Since the mark 16 on the reticle 2 is a reflecting surface, the image of the mark 16 of reticle 2 arrives at a CCD camera 9 via the mirror 8 and half-mirror 17, as a result of which the image is optoelectronically converted. Meanwhile, the illuminating light that has passed through the reticle 2 illuminates a stage mark 15, which is of the kind shown in FIG. 2B, on a stage 4 via a projecting lens 3. Reflected light from the stage mark 15 arrives at the camera 9 again through the projecting lens 3, reticle 2, mirror 8 and half-mirror 17. Thus, a mark, which is a combination of the mark 16 on the reticle and the mark 15 on the wafer 5, is imaged by the camera, as shown in FIG. 2C.

In order to raise the density of integration of modern semiconductors, it has become necessary to expose the wafer to an extremely fine pattern of less than 0.15 µm. For this reason, the exposing light source used heretofore is a KrF laser, an ArF laser or an $F_2$ laser. All of these lasers are of the pulse-output type.

Since light having a wavelength identical with that of the exposing light must be used in TTR measurement as well, a pulsed laser of a short wavelength has come to be employed.

If laser light is used as the illuminating light source for image sensing in order to detect relative positional deviation between the wafer and reticle stages, spatial coherence is high and a speckle pattern or interference fringes will occur when the wafer is irradiated with this light as is. Accordingly, the beam is oscillated or the phase of the speckle pattern or interference fringes is varied pulse by pulse by a rotary diffusion plate to irradiate the wafer with pulses a plurality of times, whereby the influence of the speckle pattern or interference fringes is eliminated by an integration effect. In a case wherein a wafer is exposed, several score or several hundred pulses are required to eliminate interference fringes or a speckle pattern. Methods of image sensing are described in detail in the specifications of U.S. Pat. Nos. 5,141,321 and 5,347,118.

As mentioned above, the illuminating light source of a semiconductor exposure apparatus uses a short wavelength to deal with the finer patterns used in modern semiconductor processes. This means that the effects of light absorption by the lens can no longer be ignored. More specifically, since the illuminating light and mark reflection light pass through the lens in both directions with regard to the stage mark 15, as shown in FIG. 1, the reflected light from the stage mark 15 is darker in comparison with the reflected light from the reticle mark 16. Since the reflected light from the reticle mark 16 does not make a round trip through the projecting lens 3, it is not affected by any absorption ascribable to the lens 3. If the reticle mark 16 and stage mark 15 are observed simultaneously, therefore, a difference in quantity of light will occur. If the reflected light from the stage mark 15 darkens to such an extent that an adequate amount of light is no longer obtained, signal contrast possessed by the obtained image may be insufficient and measurement precision may decline. If it is arranged to brighten the reflected light from the stage mark 15 in order to avoid this, then the reflected light from the reticle mark 16 will be too bright and signal saturation will occur.

SUMMARY OF THE INVENTION

Accordingly, an object of the present invention is to provide a position measuring method and apparatus in which, when the position of a first mark (e.g., a reticle mark) and the position of a second mark (e.g., a substrate mark such as a wafer mark) are obtained, it is possible to obtain the positions of the marks in a highly precise fashion even if there is a difference in contrast (amount of light) between the marks.

According to the present invention, the foregoing object is attained by providing a position measuring method, for measuring mark positions from signals that are output by a signal sensing unit that simultaneously receives reflected light from a first mark and reflected light from a second mark that is darker than the first mark, the method comprising the steps of storing a signal, which is obtained from a signal representing the second mark, in a memory in such a manner that brightness of the signal is increased to a predetermined brightness, and measuring the first mark and the second mark obtained from signals representing respective ones of the first and second marks.

Preferably, when the signals for the first and second marks are continuously added and stored in the memory, different numbers of addition operations are set for the first and second marks and the positions of the first and second marks are measured from signals each obtained by the respective number of additions.

Preferably, the number of additions applied to the signal for the first mark and the number of additions applied to the signal for the second mark are obtained from the signal of the first and second marks stored the first time.

Preferably, the number of additions applied to the signal for the first mark and the number of additions applied to the signal for the second mark are set based upon brightnesses of the signals of the first and second marks stored the first time.

Preferably, when the signals of the first and second marks are continuously added and stored in the memory, the position of the first mark is obtained from a signal for which the brightness of the signal of the first mark has exceeded a first threshold value and the position of the second mark is obtained from a signal for which the brightness of the signal of the second mark has exceeded a second threshold value.

Preferably, when the signals of the first and second marks are stored in the memory, the light storage time for the first mark and the light storage time for the second mark are each set, and the first and second marks are measured from respective ones of the signals stored over respective ones of the light storage times.

Preferably the light storage time for the second mark is obtained from light stored from the signal of the first mark.

Preferably, amounts of light of the first and second marks are obtained from the signal of the first mark, and the light storage time for the second mark is set based upon the results.

Further, according to the present invention, the foregoing object is attained by providing a position measuring apparatus for measuring mark positions from signals that are output by a signal sensing unit that simultaneously receives reflected light from a first mark and reflected light from a second mark that is darker than the first mark, the apparatus comprising a memory for storing a signal, which is obtained from a signal of the second mark, in a memory in such a manner that brightness of the signal is increased to a predetermined brightness, and a measurement unit for measuring the first mark and the second mark obtained from signals of respective ones of the first and second marks.

The present invention further provides an exposure apparatus for exposing a substrate on a stage to a pattern on a reticle via a projecting lens, comprising a memory, wherein when a first mark for measuring position of the reticle and a second mark for measuring position of the substrate through the projecting lens are detected simultaneously by a signal sensing unit and the positions of the first and second marks are measured, the memory is for storing a signal, which is obtained from a signal representing the second mark, in such a manner that brightness of the signal is increased to a predetermined brightness, and a measurement unit for measuring the first mark and the second mark obtained from signals representing respective ones of first and second marks, wherein the stage is driven based upon results of measurement by the measurement unit, whereby the reticle or the substrate or both are aligned.

The present invention further provides a method of manufacturing a semiconductor device comprising the steps of installing a group of manufacturing apparatus for performing various processes in a semiconductor manufacturing plant, and manufacturing a semiconductor device by performing a plurality of processes using the group of manufacturing apparatus, wherein the group of manufacturing apparatus includes an exposure apparatus comprising a memory, wherein when a first mark for measuring position of a reticle and a second mark for measuring position of a substrate through a projecting lens are detected simultaneously by a signal sensing unit and the positions of the first and second marks are measured, the memory is for storing a signal, which is obtained from a signal representing the second mark, in such a manner that brightness of the signal is increased to a predetermined brightness, and a measurement unit for measuring the first mark and the second mark obtained from signals representing respective ones of the first and second marks, wherein a stage is driven based upon results of measurement by the measurement unit to align the reticle or the substrate or both, thereby exposing a substrate on the stage to a pattern on the reticle via the projecting lens.

Preferably, the method of manufacturing a semiconductor device further comprises the steps of interconnecting the group of manufacturing apparatus by a local area network, and communicating information, which relates to at least one of the manufacturing apparatus in the group thereof, between the local area network and an external network outside the plant by data communication.

Preferably, maintenance information for the manufacturing apparatus is obtained by accessing, by data communication via the external network, a database provided by a vendor or user of the exposure apparatus, or production management is performed by data communication with a semiconductor manufacturing plant other than the first-mentioned semiconductor manufacturing plant via the external network.

The present invention further provides a semiconductor manufacturing plant comprising: a group of semiconductor manufacturing apparatus for performing various processes inclusive of an exposure apparatus; a local-area network for interconnecting the group of semiconductor manufacturing apparatus; and a gateway for making it possible to access, from the local-area network, an external network outside the plant, whereby information relating to at least one of the manufacturing apparatus in the group thereof can be communicated by data communication, the exposure apparatus including: a memory, wherein when a first mark for measuring the position of a reticle and a second mark for measuring the position of a substrate through a projecting lens are detected simultaneously by a signal sensing unit and the positions of the first and second marks are measured, the memory is for storing a signal, which is obtained from a signal representing the second mark, in such a manner that brightness of the signal is increased to a predetermined brightness, and a measurement unit for measuring the first mark and the second mark obtained from signals representing respective ones of the first and second marks, wherein a stage is driven based upon results of measurement by the measurement unit to align the reticle or the substrate or both, whereby a substrate on the stage is exposed to a pattern on the reticle via the projecting lens.

The present invention further provides a method of maintaining an exposure apparatus installed in a semiconductor manufacturing plant, comprising the steps of: providing a maintenance database, which is connected to an external network of the semiconductor manufacturing plant, by a vendor or user of the X-ray exposure apparatus, allowing access to the maintenance database from within the semiconductor manufacturing plant via the external network, and transmitting maintenance information, which is stored in the maintenance database, to the side of the semiconductor manufacturing plant via the external network, the exposure apparatus including: a memory, wherein when a first mark for measuring position of a reticle and a second mark for measuring position of a substrate through a projecting lens are detected simultaneously by a signal sensing unit and the positions of the first and second marks are measured, the memory is for storing a signal, which is obtained from a signal representing the second mark, in such a manner that brightness of the signal is increased to a predetermined brightness, and a measurement unit for measuring the first mark and the second mark is obtained from signals representing respective ones of the first and second marks, wherein a stage is driven based upon results of measurement by the measurement unit to align the reticle or the substrate or both, whereby a substrate on the stage is exposed to a pattern on the reticle via the projecting lens.

Preferably, the exposure apparatus further comprises a display, a network interface, and a computer for running network software, wherein maintenance information relating to the exposure apparatus is communicated by data communication via a computer network.

Preferably, the network software provides the display with a user interface for accessing a maintenance database, which is connected to an external network of a plant at which the exposure apparatus has been installed, and which is supplied by a vendor or user of the exposure apparatus, thereby making it possible to obtain information from the database via the external network.

An effect obtained by virtue of the arrangement described above is that it is possible to measure the position of a first mark, such as a reticle mark, and the position of a second mark, such as a stage mark, using sufficient signal contrast even if there is a difference between the amounts of light of signals representing the first and second marks. As a result, a deviation in the position of a substrate can be detected with high precision and alignment with respect to a reference position can be carried out in a highly precise manner. This makes it possible to manufacture a highly precise semiconductor device.

Other objects and advantages besides those discussed above shall be apparent to those skilled in the art from the description of a preferred embodiment of the invention which follows. In the description, reference is made to the accompanying drawings, which form a part thereof, and which illustrate an example of the invention. Such an example, however, is not exhaustive of the various embodiments of the invention, and, therefore, reference is made to the claims which follow the description for determining the scope of the invention.

BRIEF DESCRIPTION OF THE DRAWINGS

FIG. 10 shows a specific example of a user interface;

DESCRIPTION OF THE PREFERRED EMBODIMENTS

First Embodiment

A first embodiment of the present invention will be described with reference to the drawings.

Figure 1:
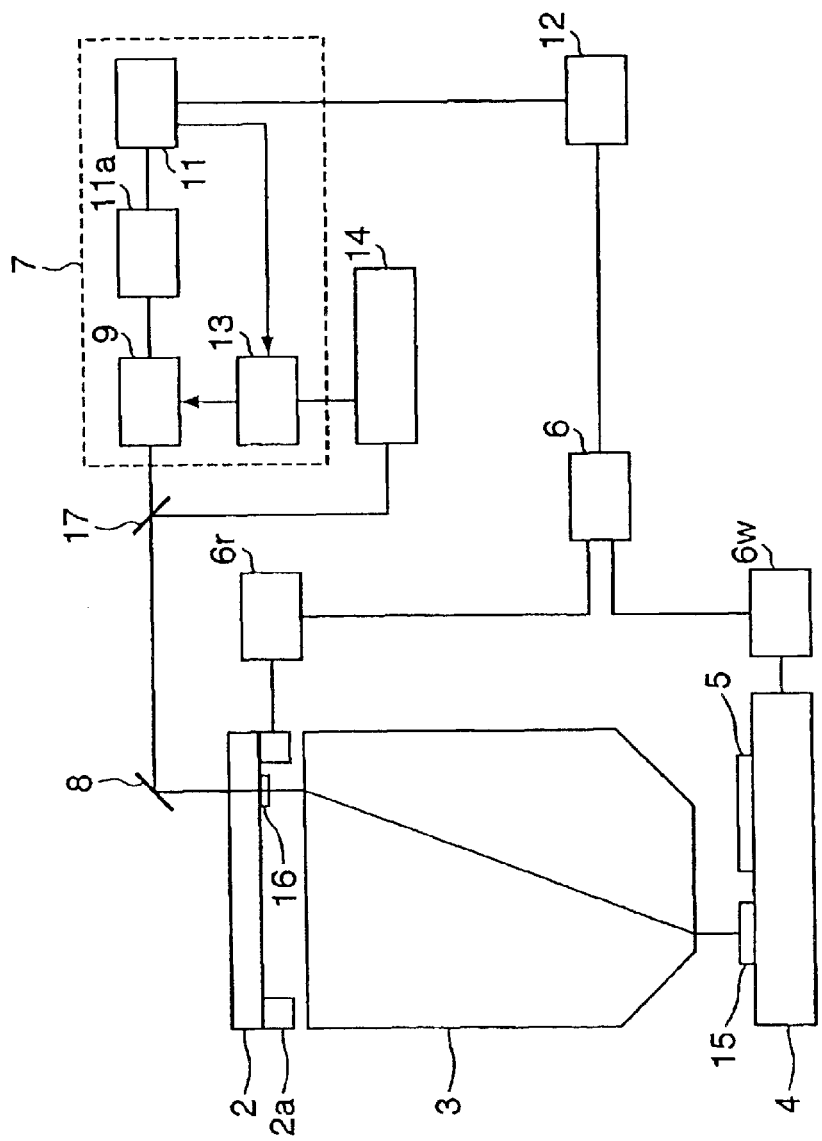
FIG. 1 is a diagram illustrating a semiconductor manufacturing apparatus having a position measuring apparatus according to a first embodiment of the present invention.

FIG. 1 is a block diagram illustrating the first embodiment of the present invention.

As shown in FIG. 1, illuminating light emitted from the illuminating system 14, which is illuminating means having a pulse laser as its light source, exposes the wafer 5, which is a substrate on the wafer stage 4, via the reticle 2 and the projecting lens system 3.

The wafer stage 4 is capable of being moved back and forth by a stage drive system 6 and a wafer stage drive unit 6w, which serve as driving means, along two orthogonal axes (X and Y axes) in a plane perpendicular to the plane of the drawing. The wafer stage 4 can also be rotated about an axis (the Z axis) perpendicular to the above-mentioned plane.

A reticle stage 2a holding the reticle 2 also may be moved freely back and forth by the stage drive system 6 and a reticle stage drive unit 6r along each of the X and Y axes and may be rotated freely about the Z axis as well.

Thus, the stage drive system 6 adjusts the relative positions of the reticle stage 2a and the wafer stage 4 by a main controller 12, described later.

An alignment detection system 7 detects the positional relationship of alignment marks, which are positioning marks provided on the reticle 2 and wafer 5. The alignment detection system 7 uses part of the illuminating light from the illuminating system 14, which has a function for suppressing a speckle pattern by temporally varying the wavefront of the illuminating light, as illuminating light for alignment. The light arrives at the stage mark 15 via the half-mirror 17, mirror 8 and projecting lens 3, is reflected by the stage mark 15 and returns to the half-mirror 17 via the projecting lens system 3 and mirror 8. Similarly, the light arrives at the reticle mark 16 via the half-mirror 17 and mirror 8, is reflected by the reticle mark 16 and returns to the half-mirror 17 via the mirror 8. The reflected light from the stage mark 15 and the reflected light from the reticle mark 16 is detected by the CCD camera 9.

Figure 2A:
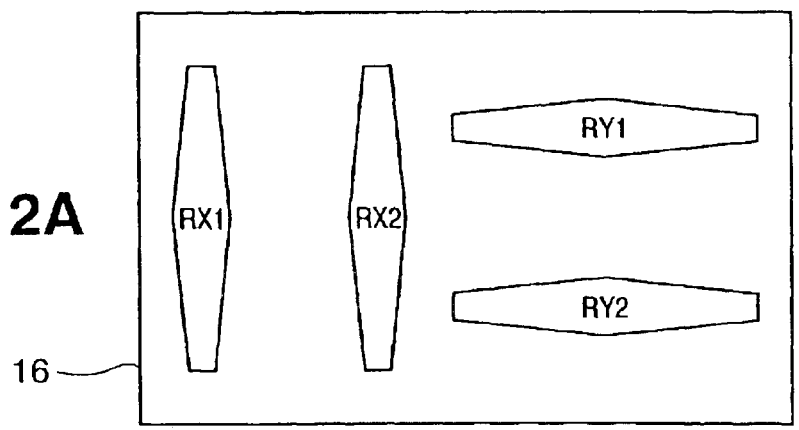
FIGS. 2A to 2C are diagrams illustrating marks measured by the position measuring apparatus of the first embodiment.
Figure 2B:
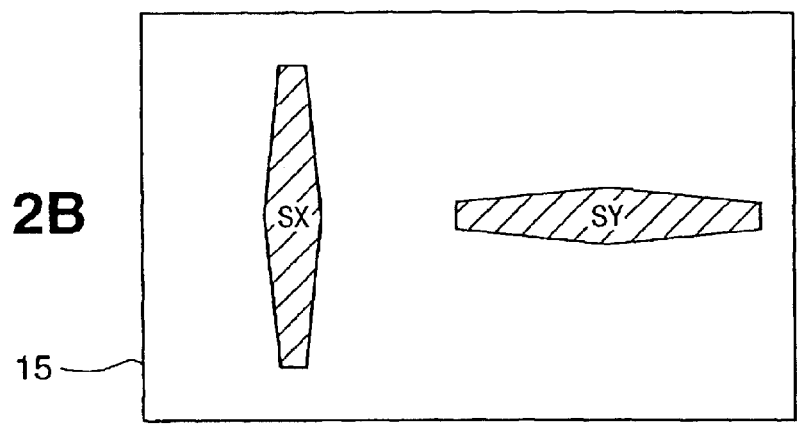
Figure 2C:
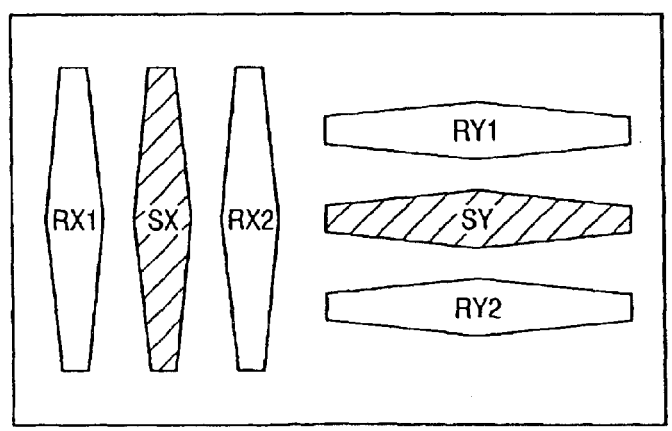

FIG. 2B illustrates an example of the shape of stage mark 15 and FIG. 2A an example of the shape of reticle mark 16. In an actual demagnifying-projection-type exposure apparatus, a detection system similar to the alignment detection system 7 is provided at positions symmetrical to and offset from the optical axis of the projecting lens system 3, though this detection system is not shown in FIG. 1.

The light storage time of the CCD camera 9 in the alignment detection system 7 and the laser oscillation of the illuminating system 14 are synchronized by a synchronizing signal generator 13 and control is performed in such a manner that light of the same number of pulses at all times will impinge upon the camera within a fixed storage time. The details are described in the specification of U.S. Pat. No. 5,141,321.

A method of measuring a mark position will now be described.

Figure 3A:
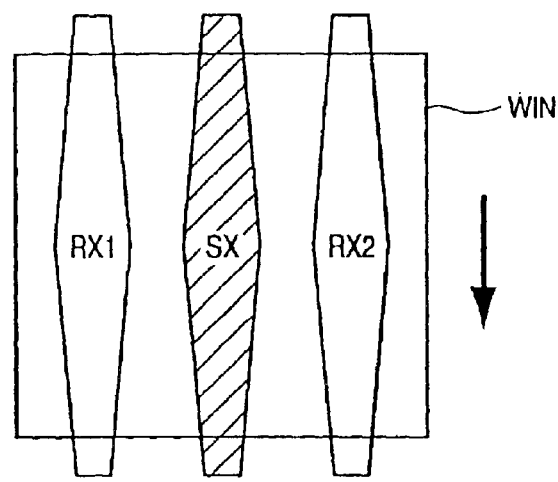
FIGS. 3A to 3D are diagrams illustrating a position measuring method according to the first embodiment.
Figure 3B:
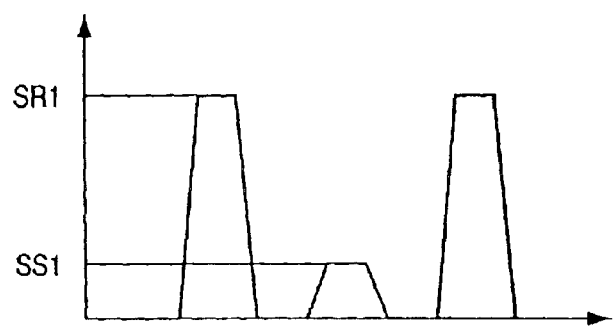
Figure 3C:
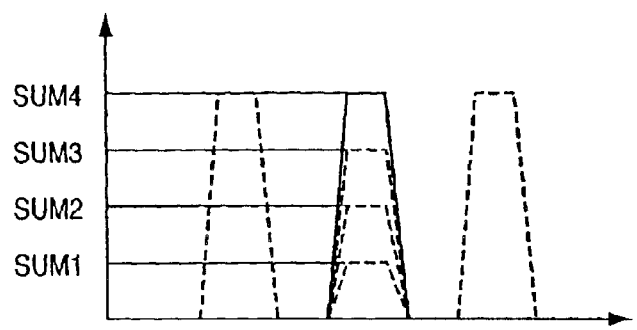
Figure 3D:
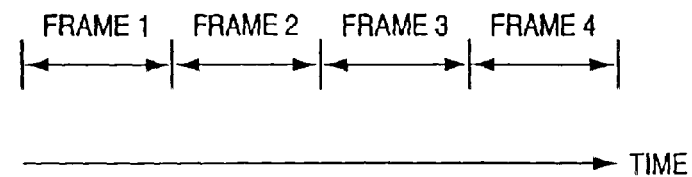

In the case of a camera for which the light storage time is fixed, such as a camera based upon the NTSC system, an image that has been stored in a time series, as in the manner of frames 1 to 4 in FIG. 3D, is transferred from the camera 9. The image of the mark in the X direction shown in FIG. 3A projects an image in a preset window (WIN) in the direction of the arrow thereby creating a signal (FIG. 3B). The signal intensity (SS1) of the stage mark 15 is lower than the signal intensity (SR1) of the reticle mark 16 owing to the effects of light absorption by the lens. Using a dimmer (not shown) in the illuminating system, an adjustment can be performed so as to obtain a measurable amount of light in such a manner that the reticle mark 16 can be detected at the intensity signal SR1.

However, since the stage mark 15 is dark, measurement cannot be performed under these conditions. Accordingly, how low the signal intensity SS1 is with respect to the intensity signal SR1 is found in terms of an amount of light and the amount of shortfall is compensated for by sensing the image of the stage mark 15 a plurality of times. For example, in the case of FIG. 3B, the amount of light from the stage mark 15 is about one-fourth of the amount of light from the reticle mark 16. Accordingly, the image of this mark is sensed three more times and the total of the four images is added to create a signal whose intensity is approximately the same as the signal intensity of the reticle mark 16. This process is depicted in FIG. 3C. In this case, addition of the signal representing the reticle mark 16 is not considered. Signal addition is performed four times to the raise contrast (amount of light) of the signal up to an intensity indicated by SUM4. In this description, the image whose amount of light is initially detected is an image sensed a single time. However, the image may be sensed and summed n times ($n \geq 2$) in order to eliminate image noise. In such a case, the four additions mentioned in the above example would become 4×n additions.

Image addition will be described next.

The output of the camera 9 in the alignment detection system 7 is converted from an analog to a digital signal and the digital signal is stored in an image memory 11a. The image memory 11a is capable of storing a plurality of images. For example, in the case of this embodiment, it will suffice if the image memory 11a is capable of storing an image sensed one to four times. The plurality of images are added by an image processing unit 11. In the case of this embodiment, four images that have been stored in the image memory 11a are added to create a measurement image of the stage mark 15, thereby creating the sum image SUM4.

In measurement of mark position, positions RX1, RX2 of the reticle mark 16 are found by the image processing unit 11 from the first sensed image, and center position RXC of the reticle mark 16 is found by the image processing unit 11 from the average value of RX1 and RX2. On the other hand, position SX of the stage mark 15 is found from the image obtained by addition four times. The image processing unit 11 then finds the amount of positional deviation between the reticle mark 16 and the stage mark 15 from the difference between RXC and SX, namely from RXC−SX.

Since it is apprehended that the position of the reticle mark 16 will shift during the four image-sensing operations, a reticle center position RXC (4) may be found from not only the first image but also from the fourth image and the average of RXC and RXC (4) may be adopted as RXC. Furthermore, RXC (1), RXC (2), RXC (3), RXC (4) can be found from the data representing each of the images and the position of the reticle mark 15 can be calculated accurately using the average value of these values. The reticle 2 and wafer 5 are aligned by moving the wafer stage 4 or the reticle stage 2a or both based upon the results of measurement.

The flow of measuring processing according to the first embodiment will now be described with reference to FIG. 5.

Figure 5:
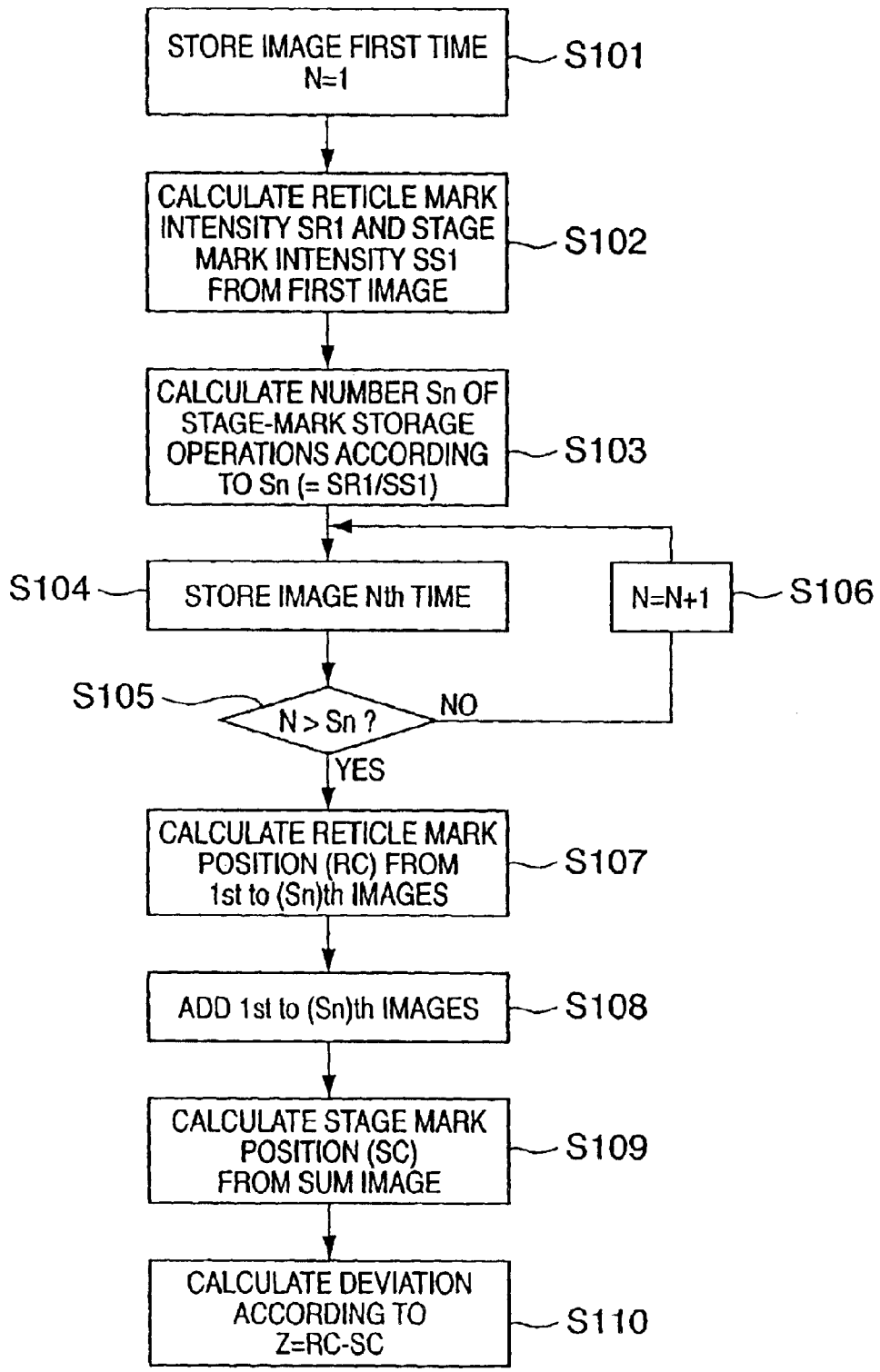
FIG. 5 is a flowchart illustrating position measurement processing according to the first embodiment.

The first image sensing is performed at step S101 in FIG. 5. Then, at step S102, brightness SR1 of the reticle mark 16 and brightness SS1 of the stage mark 15 are found. This is followed by step S103, at which the number Sn (=SR1/SS1) of storage operations regarding the image of stage mark 15 is calculated from the ratio of brightness of reticle mark 16 to the brightness of stage mark 15, after which storage of the image is repeated Sn times (steps S104, S105, S106). If the number of times the image has been stored exceeds Sn times ("YES" at step S105), the center of the reticle mark 16 is found from each of the $1^{st}$ to $(Sn)^{th}$ images and the average value RC is found at step S107. Next, at step S108, the $1^{st}$ to $(Sn)^{th}$ images are added and the position SC of the stage mark 15 is found from the sum image at step S109. Finally, deviation Z (=RC−SC) between the reticle mark 16 and stage mark 15 is found at step S110.

Note that the mark position is sensed by the CCD camera in the first embodiment, and a photo-electric conversion element, such as a line sensor, can be used.

Second Embodiment

In the first embodiment, the dimmer in the illumination system is used to make an adjustment so as to obtain a measurable amount of light when the first image-sensing operation is performed, and the number of times the stage mark 15 is summed is decided from the results of the first image-sensing operation. However, a method that is not provided with a dimmer will be described in a second embodiment of the invention.

It is known beforehand that the bright mark is the reticle mark 16. Accordingly, images of the reticle mark 16 are stored and summed. If, in the process of this operation, a threshold value THR of a signal intensity needed to measure the reticle mark 16 is exceeded, then the image (frame R) prevailing at this moment is stored. Furthermore, image sensing and addition are repeated and an image (frame S) prevailing when a threshold value THS of signal intensity needed to measure the reticle mark 15 is exceeded is stored.

The position of the reticle mark 16 is found from the image of frame R, the position of stage mark 15 is found from the image of frame S and the deviation between the reticle mark 16 and stage mark 15 are found. The reticle 2 and wafer 5 are aligned by moving the wafer stage 4 or the reticle stage 2a or both based upon the results of measurement.

Figure 6:
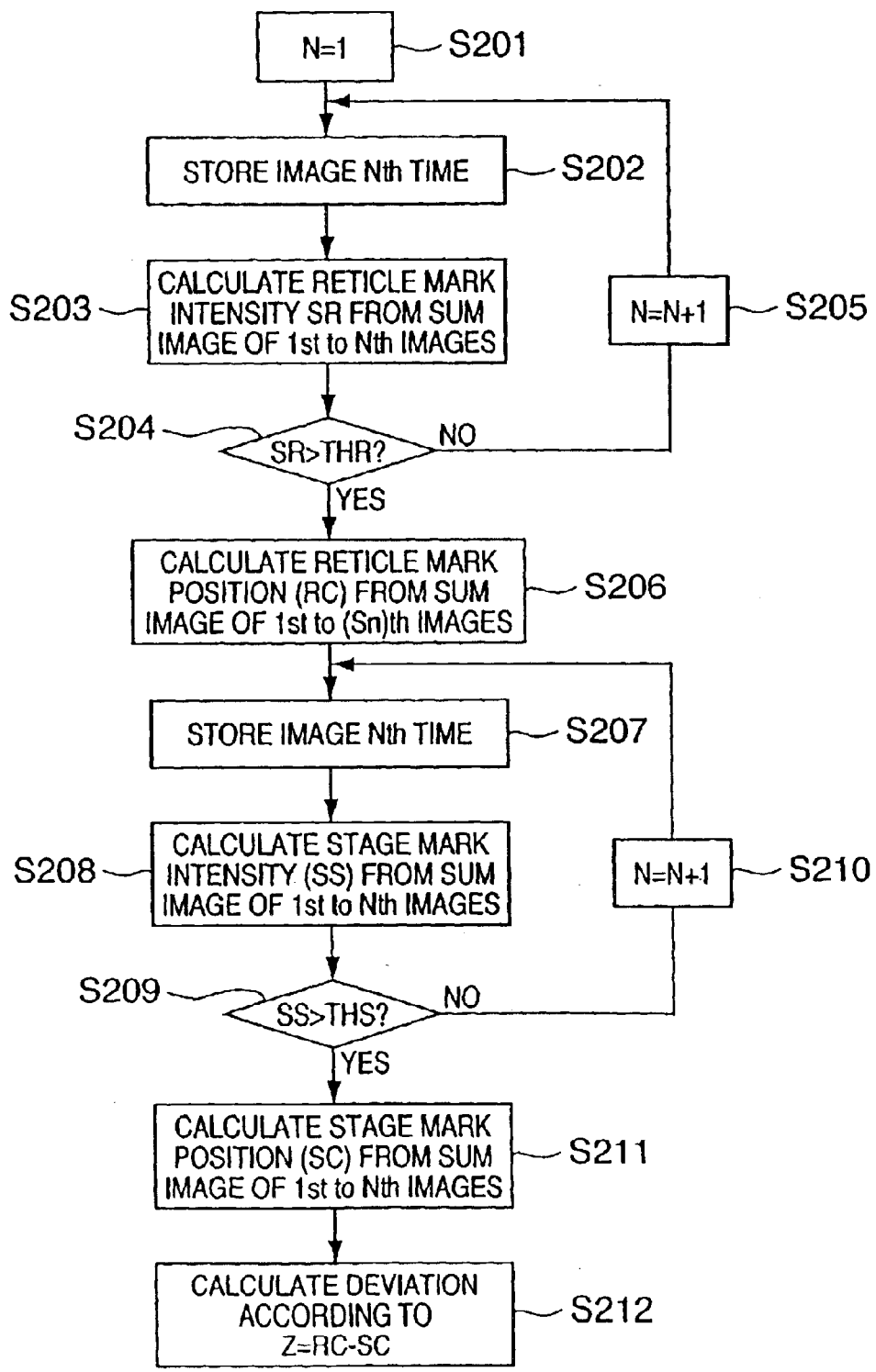
FIG. 6 is a flowchart illustrating position measurement processing according to a second embodiment of the present invention.

The flow of measurement processing according to the second embodiment will now be described with reference to FIG. 6.

The first image sensing is performed at step S201, after which the storage and addition of the image of reticle mark 16 are repeated until the signal intensity SR of the reticle mark exceeds 16 the threshold value THR (steps S202, S203, S204 and S205). When the signal intensity SR exceeds the threshold value ("YES" at step S204), the center RC of the reticle mark 16 is found from the image frame R after addition. Next, the storage and addition of the image of reticle mark 15 are repeated until the signal intensity SS of the reticle mark 15 exceeds the threshold value THS (steps S207, S208, S209 and S210). When the signal intensity SS exceeds the threshold value ("YES" at step S209), the center SC of the reticle mark 15 is found from the image frame S after addition (step S211). Finally, deviation Z (=RC−SC) between the reticle mark 16 and stage mark 15 is found at step S212.

Third Embodiment

The first embodiment illustrates an example of image sensing at a fixed storage time as in the NTSC system. In a third embodiment of the invention, a camera in which storage time is variable can be used as the camera. This will be described with reference to FIG. 4.

The method of mark illumination and the optical path up to the point of imaging are the same as in the first embodiment and need not be described again.

Figure 4A:
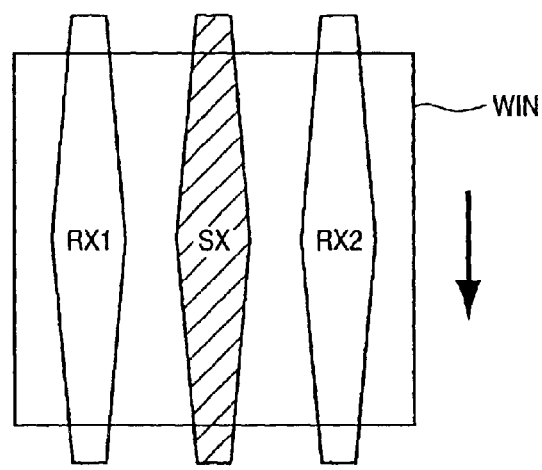
FIGS. 4A to 4D are diagrams illustrating a position measuring method according to a third embodiment of the present invention.
Figure 4B:
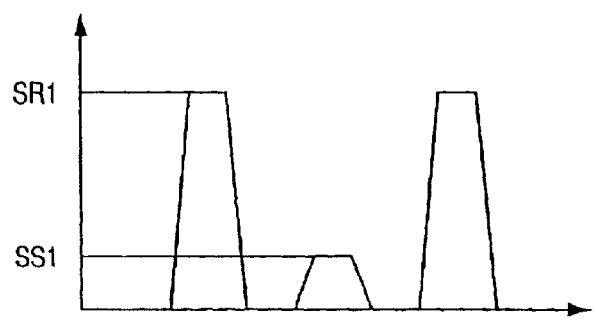
Figure 4C:
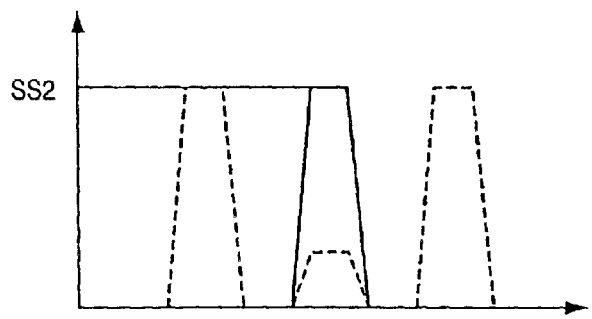
Figure 4D:
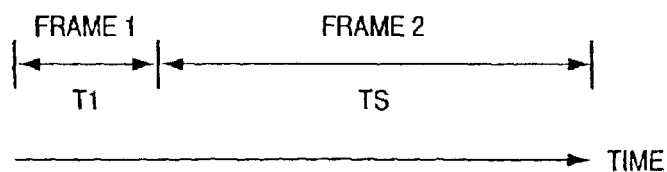

In this embodiment, a first image sensing is performed at a predetermined reference storage time (T1), and signal intensity SR1 of the reticle mark 16 and signal intensity SS1 of the stage mark 15 are detected from the image shown in FIG. 4A. From these signal intensities, storage time for imaging the stage mark 15 is obtained by the following calculation:

$$TS=(SR1/SS1)*T1.$$

The storage time of CCD camera 9 is changed to TS and the stored number of laser pulses also is made a factor of SR1/SS1. As a result, the signal intensity of the stage mark 15 becomes SS2, which is approximately the same as that of the reticle mark 16.

Since the image over storage time T1 and the image over storage time TS are stored in the image memory 11a, the center position RXC of reticle mark 15 and the center position SX of stage mark 15 are found from respective ones of these images, and the amount of deviation between the reticle mark 16 and the stage mark 15 is found from the difference between RXC and SX, namely from RXC–SX. The reticle 2 and wafer 5 are aligned by moving the wafer stage 4 or the reticle stage 2a or both based upon the results of measurement.

Figure 7:
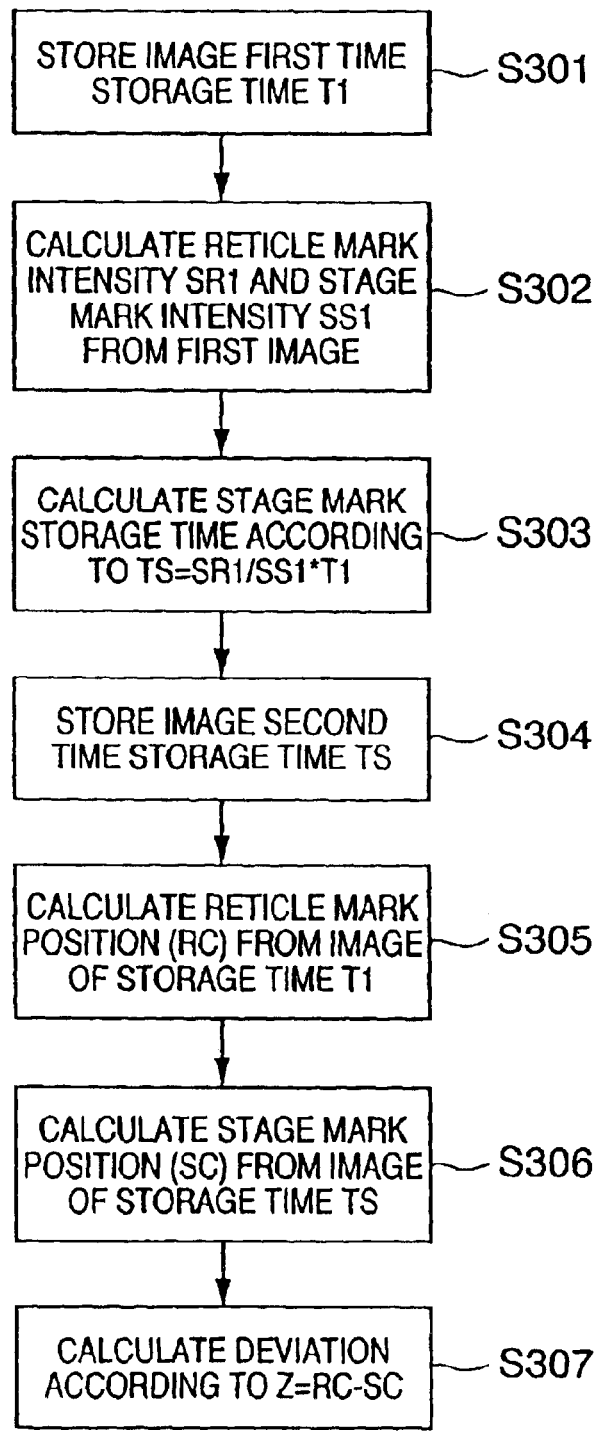
FIG. 7 is a flowchart illustrating position measuring processing according to a third embodiment.

The flow of measurement processing according to the third embodiment will now be described with reference to FIG. 7.

The image obtained by the first sensing operation is stored at storage time T1 at step S301. Next, at step S302, the signal intensity SR1 of the reticle mark 16 and signal intensity SS1 of the stage mark 15 are found from the first image. Then, at step S303, the storage time TS for sensing the image of stage mark 15 is calculated from the ratio between the two intensity signals. Next, the image over time TS is stored at step S304, the position RC of reticle mark 16 is calculated from the image of storage time T1 at step S305, the position SC of stage mark 15 is obtained from the image of storage time TS, and the deviation Z between the reticle mark 16 and stage mark 15 is found from the difference between RC and SC at step S307.

As a modification of the second and third embodiments, the number of sensed frames of each of the marks can be changed in accordance with signal intensity. For example, if the signal-intensity ratio SR1/SS1 approaches an integer, it is conceivable that summing of images may become necessary also with regard to the reticle mark 16. In such a case, different numbers of additions can be set for the stage mark and for the reticle mark to make the brightness of the continuously summed images substantially uniform, and these images can be stored in the image memory and utilized.

Fourth Embodiment

Figure 13:
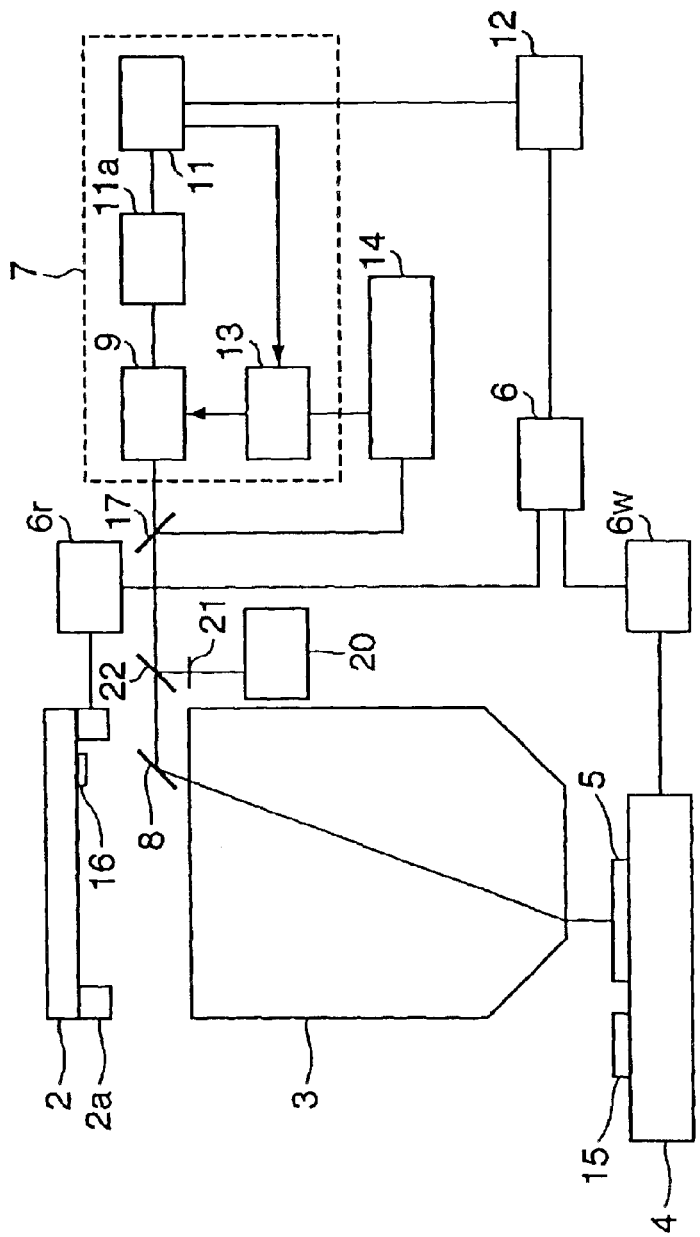
FIG. 13 is a diagram illustrating a position measuring apparatus according to a fourth embodiment of the present invention.

In the above embodiments, the first and second marks are made the reticle and stage marks, respectively. However, the present invention can be applied in a similar fashion even if the first mark is made an index mark with a TTL scope and the second mark is made a mark on the wafer. Reference will be had to FIG. 13 to describe the fourth embodiment. The imaging process is the same as that of the foregoing embodiments and need not be described again.

The alignment mark on the wafer 5 is illuminated via half-mirrors 17, 22, mirror 8 and projecting lens system 3 by light from light source 14, such as a laser or halogen lamp, having the wavelength of exposing light or non-exposing light. Light reflected from the mark arrives at the camera 9 via the projecting lens system 3, mirror 8 and half-mirrors 22, 17. The image of the mark is sensed by the camera 9. Meanwhile, an index mark 21 on the scope is illuminated by an illuminating unit 20, light that has passed through the mark 21 is reflected by the half-mirror 22, and this light merges with the light from the mark on the wafer. The resultant light arrives at the camera 9. Accordingly, the image sensed by the camera 9 is an image that is the result of combining the images of the wafer mark and index mark. If the brightness of the wafer mark is less than that of the index mark in this case, optimum imaging for measurement can be carried out by having the alignment detection system 7 exercise control using any of the methods of the first to third embodiments.

It should be noted that the method of illuminating the index mark is not limited to transmissive illumination; reflective illumination using the light source 14 that illuminates the wafer mark may be employed. Further, placement of the index mark is not limited to the front side of the mirror 8; the mark may be placed directly in front of the camera 9. The mark may be disposed at any position if the positional relationship between the mark and the position of the projecting lens system 3, the position of stage 4 or the position of reticle stage 2a or of reticle mark 16 has been determined beforehand.

Fifth Embodiment

Figure 14:
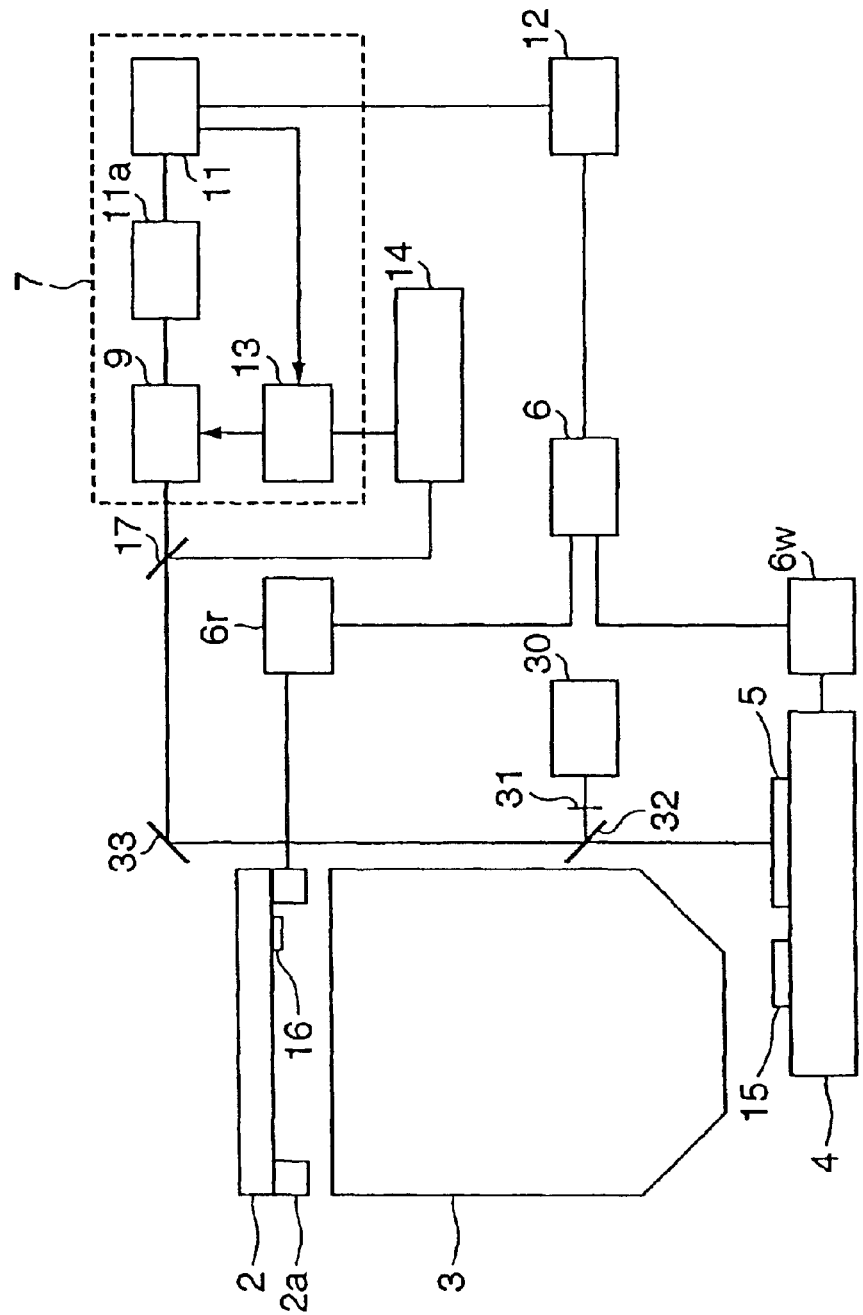
FIG. 14 is a diagram illustrating a position measuring apparatus according to a fifth embodiment of the present invention.

In the first to third embodiments, the first and second marks are made the reticle and stage marks, respectively. However, the present invention can be applied in a similar fashion even if the first mark is made an index mark within an off-axis scope and the second mark is made a mark on the wafer. Reference will be had to FIG. 14 to describe the fifth embodiment. The imaging processing is the same as the of the foregoing embodiments and need not be described again.

The alignment mark on the wafer 5 is illuminated via half-mirror 17, mirror 33 and half-mirror 32 by light from light source 14, such as a laser or halogen lamp, having the wavelength of exposing light or non-exposing light. Light reflected from the mark arrives at the camera 9 via the half-mirror 32, mirror 33 and half-mirror 17. The image of the mark is sensed by the camera 9. Meanwhile, an index mark 31 on the scope is illuminated by an illuminating unit 30, light that has passed through the mark 31 is reflected by the half-mirror 32, and this light merges with the light from the mark on the wafer. The resultant light arrives at the camera 9. Accordingly, the image sensed by the camera 9 is an image that is the result of combining the images of the wafer mark and index mark. If the brightness of the wafer mark is less than that of the index mark in this case, optimum imaging for measurement can be carried out by having the alignment detection system 7 exercise control using any of the methods of the first to third embodiments.

It should be noted that the method of illuminating the index mark is not limited to transmissive illumination; reflective illumination using the light source 14 that illuminates the wafer mark may be employed. Further, placement of the index mark is not particularly limited; the mark may be placed directly in front of the camera 9, for example. The mark may be disposed at any position if the positional relationship between the mark and the position of the projecting lens system 3, the position of stage 4 or the position of reticle stage 2a or of reticle mark 16 has been determined beforehand.

Embodiment of A Semiconductor Production System

Described next will be an example of a system for producing semiconductor devices (e.g., semiconductor chips such as IC and LSI chips, liquid crystal panels, CCDs, thin-film magnetic heads and micromachines, etc.) utilizing the semiconductor manufacturing apparatus according to the present invention. This system utilizes a computer network outside the semiconductor manufacturing plant to provide troubleshooting and regular maintenance of manufacturing equipment installed at the manufacturing plant and to furnish maintenance service such as the provision of software.

Figure 8:
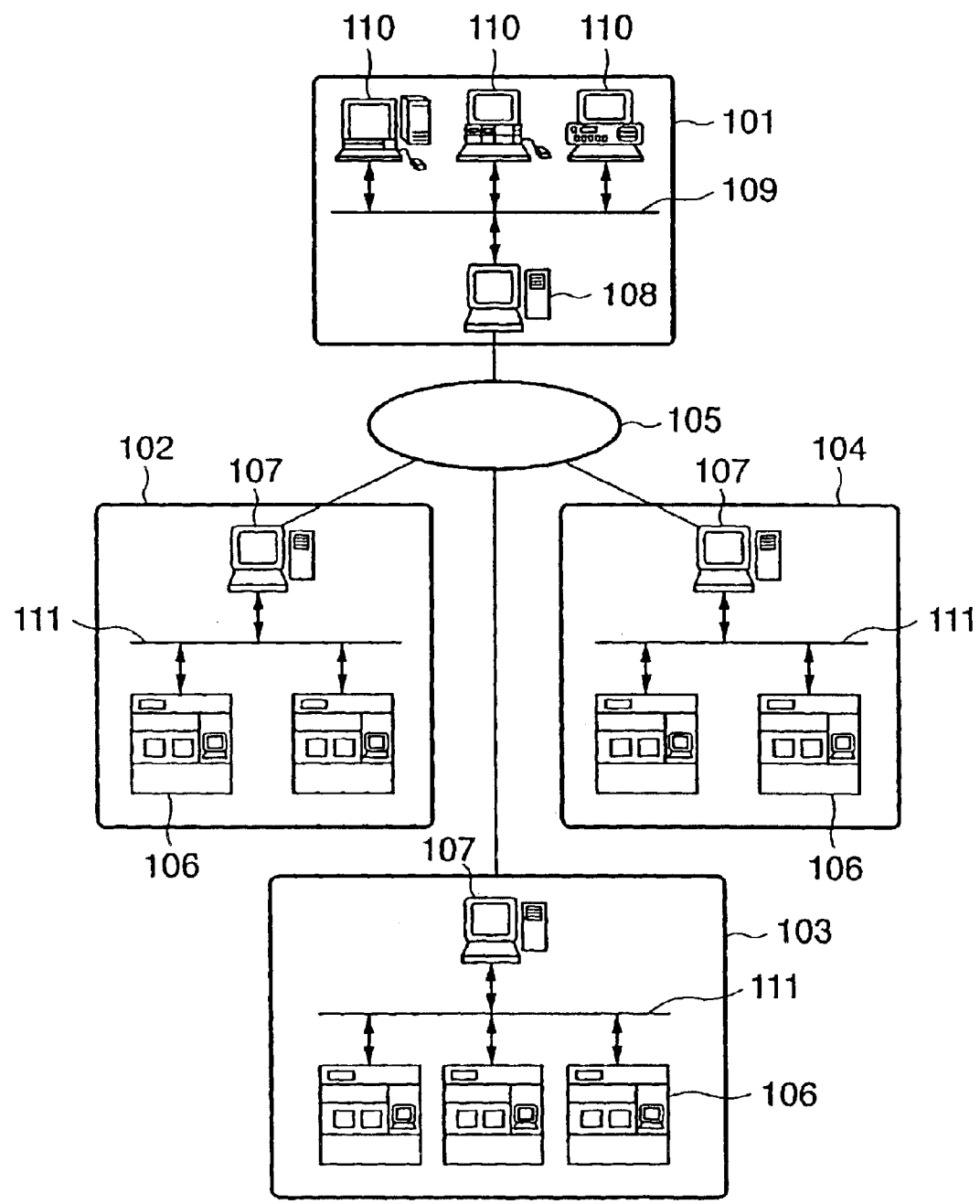
FIG. 8 is a conceptual view showing a semiconductor device production system, which employs a position measuring apparatus according to an embodiment of the invention, as seen from a certain angle.

FIG. 8 illustrates the overall system as seen from a certain angle. The system includes a business office 101 of the vendor (equipment supplier) that provides the apparatus for manufacturing semiconductor devices. Semiconductor manufacturing apparatus for performing various processes used in a semiconductor manufacturing plant are assumed to be the manufacturing apparatus. Examples of the apparatus are pre-treatment apparatus (e.g., lithographic apparatus such as exposure apparatus, resist treatment apparatus and etching apparatus, heat treatment apparatus, thin-film apparatus, heat treatment apparatus, thin-film apparatus and smoothing apparatus, etc.) and post-treatment apparatus (e.g., assembly apparatus and inspection apparatus, etc.). The business office 101 includes a host management system 108 for providing a manufacturing-apparatus maintenance database, a plurality of control terminal computers 110, and a local-area network (LAN) 109 for connecting these components into an intranet. The host management system 108 has a gateway for connecting the LAN 109 to the Internet 105, which is a network external to the business office 101, and a security function for limiting access from the outside.

Numerals 102 to 104 denote manufacturing plants of semiconductor makers, which are the users of the manufacturing apparatus. The manufacturing plants 102 to 104 may be plants belonging to makers that differ from one another or plants belonging to the same maker (e.g., pre-treatment plants and post-treatment plants, etc.). Each of the plants 102 to 104 is provided with a plurality of manufacturing apparatus 106, a local-area network (LAN) 111, which connects these apparatus to construct an intranet, and a host management system 107 serving as a monitoring unit for monitoring the status of operation of each manufacturing apparatus 106. The host management system 107 provided at each of the plants 102 to 104 has a gateway for connecting the LAN 111 in each plant to the Internet 105 serving as the external network of the plants. As a result, it is possible for the LAN of each plant to access the host management system 108 on the side of the vendor 101 via the Internet 105. By virtue of the security function of the host management system 108, users allowed to access the host management system 108 are limited. More specifically, status information (e.g., the condition of a manufacturing apparatus that has malfunctioned), which indicates the status of operation of each manufacturing apparatus 106, can be reported from the plant side to the vendor side via the Internet 105. In addition, information in response to such notification (e.g., information specifying how to troubleshoot the problem, troubleshooting software and data, etc.), as well as the latest software and maintenance information such as help information, can be acquired from the vendor side. A communication protocol (TCP/IP), which is used generally over the Internet, is employed for data communication between the plants 102~104 and the vendor 101 and for data communication over the LAN 111 within each plant. Instead of utilizing the Internet as the external network of a plant, it is also possible to utilize a highly secure leased-line network (e.g., an ISDN, for example) that cannot be accessed by a third party. Further, the host management is not limited to that provided by a vendor, for an arrangement may be adopted in which the user constructs a database, places it on an external network and allows the database to be accessed from a number of plants of users.

Figure 9:
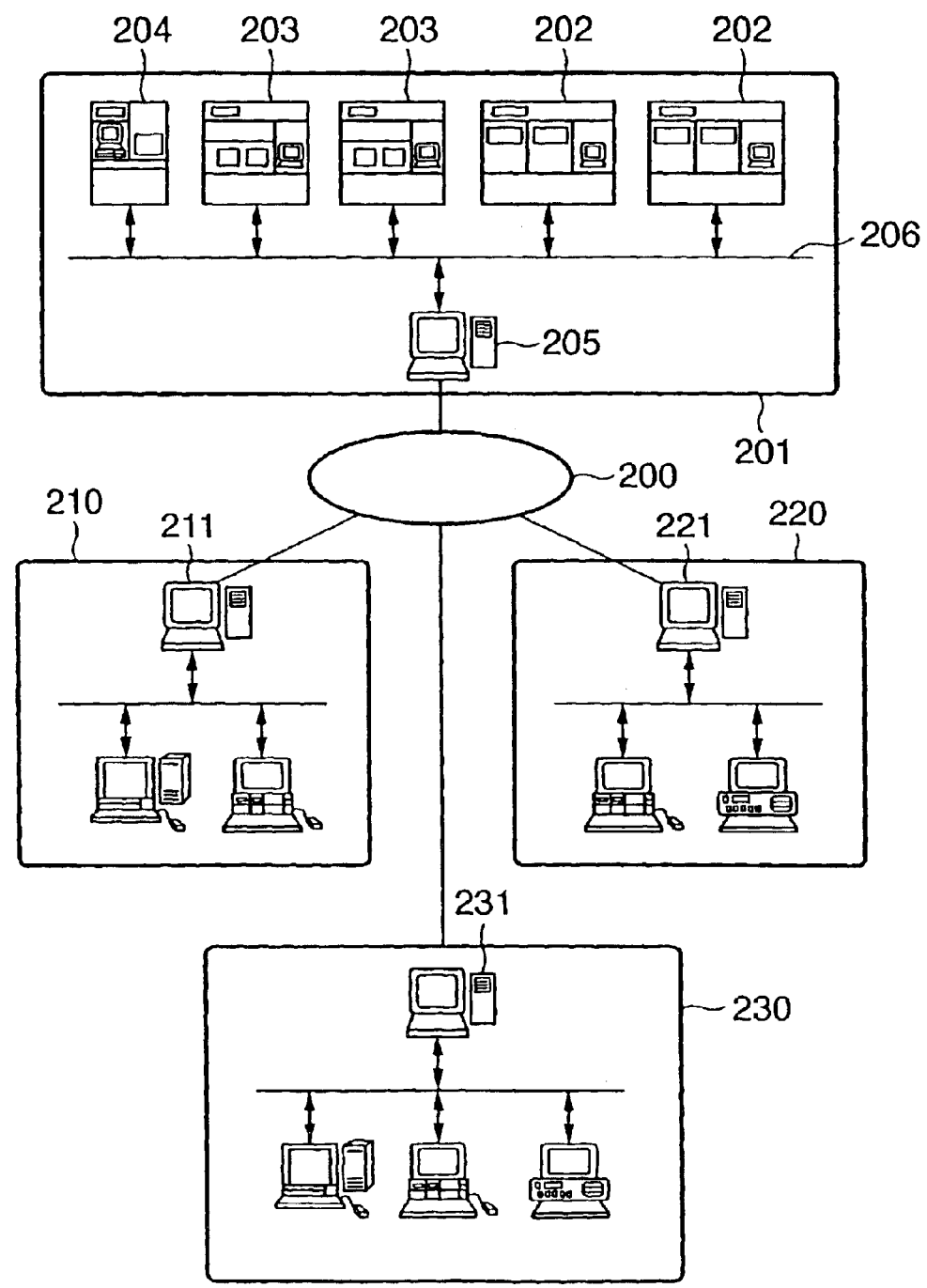
FIG. 9 is a conceptual view showing the semiconductor device production system, which employs a position measuring apparatus according to this embodiment, as seen from an other angle.

FIG. 9 is a conceptual view illustrating the overall system of this embodiment as seen from an angle different from that depicted in FIG. 8. In the earlier example, a plurality of user plants each having manufacturing apparatus are connected by an external network to the management system of the vendor that provided the manufacturing apparatus, and information concerning the production management of each plant and information concerning at least one manufacturing apparatus is communicated by data communicated via the external network. In the example of FIG. 9, on the other hand, a plant having manufacturing apparatus provided by a plurality of vendors is connected by an outside network to management systems of respective ones of the vendors of these plurality of manufacturing apparatus, and maintenance information for each manufacturing apparatus is communicated by data communication. As shown in the drawing, the system includes a manufacturing plant 201 of the user of the manufacturing apparatus (the maker of semiconductor devices). The manufacturing line of this plant includes manufacturing apparatus for implementing a variety of processes. Examples of such apparatus are exposure apparatus 202, resist treatment apparatus 203 and thin-film treatment apparatus 204. Though only one manufacturing plant 201 is shown in FIG. 9, in actuality, a plurality of these plants are networked in the same manner. The apparatus in the plant are interconnected by a LAN 206 to construct an intranet and the operation of the manufacturing line is managed by a host management system 205.

The business offices of vendors (equipment suppliers) such as an exposure apparatus maker 210, a resist treatment apparatus maker 220 and a thin-film apparatus equipment maker 230 have host management systems 211, 221, 231, respectively, for remote maintenance of the apparatus they have supplied. These have maintenance databases and gateways to the outside network, as described earlier. The host management system 205 for managing each apparatus in the manufacturing plant of the user is connected to the management systems 211, 221, 231 of the vendors of these apparatus by the Internet or leased-line network serving as an external network 200. If any of the series of equipment in the manufacturing line malfunctions, the line ceases operating. However, this can be dealt with rapidly by receiving remote maintenance from the vendor of the faulty equipment via the Internet 200, thereby making it possible to minimize line downtime.

Each manufacturing apparatus installed in the semiconductor manufacturing plant has a display, a network interface and a computer for executing network-access software and equipment operating software stored in a storage device. The storage device can be an internal memory or a hard disk or a network file server. The software for network access includes a special-purpose or general-purpose Web browser and presents a user interface, which has a screen of the kind shown by way of example in FIG. 10, on the display. The operator managing the manufacturing equipment at each plant enters information of the input items on the screen while observing the screen. The information includes model 401 of the manufacturing apparatus, its serial number 402, subject matter 403 of the problem, its date of occurrence 404, degree of urgency 405, the particular condition 406, countermeasure method 407 and progress report 408. The entered information is transmitted to the maintenance database via the Internet. The resulting appropriate maintenance information is sent back from the maintenance database and is presented on the display screen. The user interface provided by the Web browser implements hyperlink functions 410, 411, 412 as illustrated and enables the operator to access more detailed information for each item, to extract the latest version of software, which is used for the manufacturing equipment, from a software library provided by the vendor and to acquire an operating guide (help information) for reference by the plant operator. Accordingly, the maintenance information provided by the maintenance database also includes information relating to the present invention described above, and the software library also provides the latest software for implementing the present invention.

Figure 11:
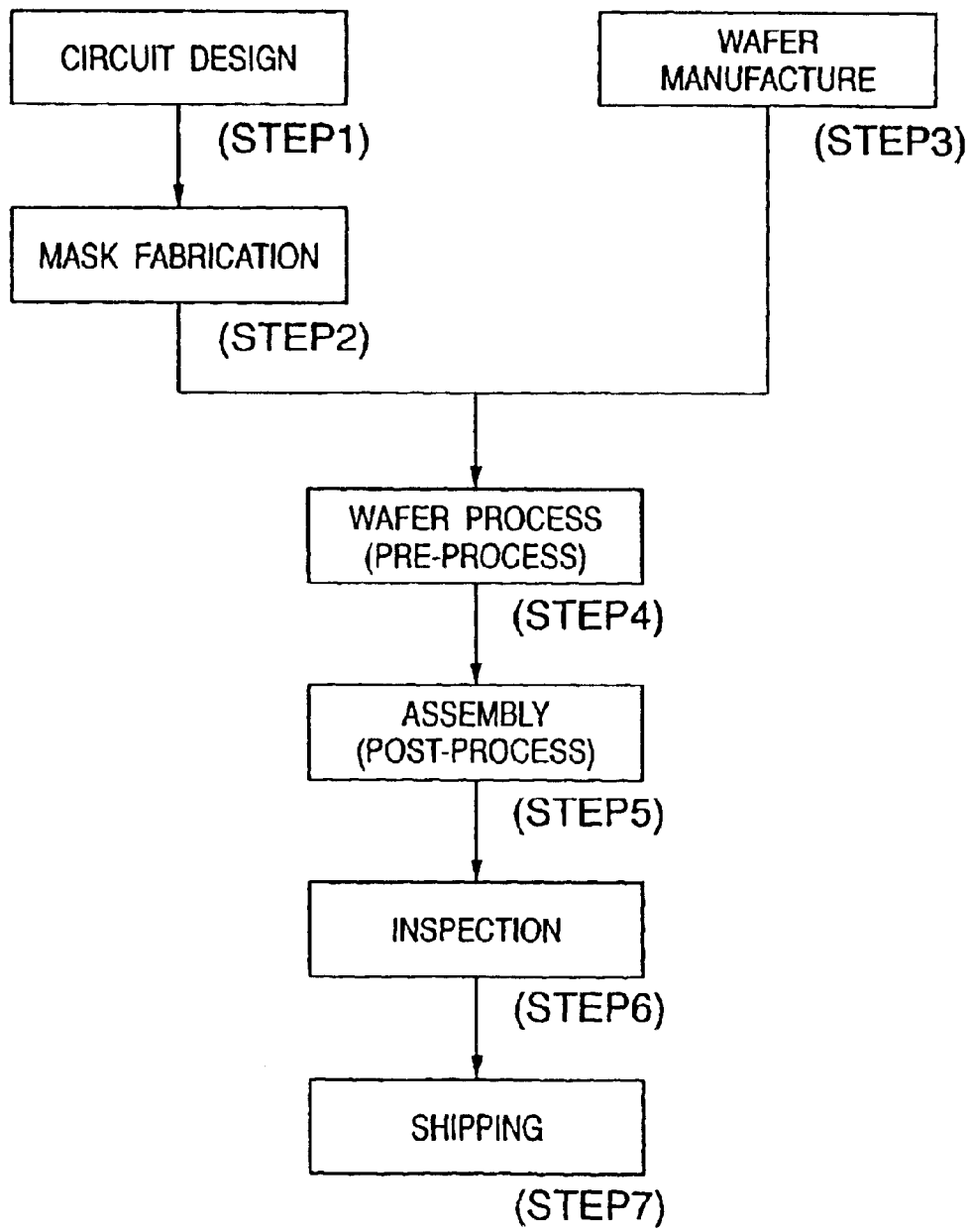
FIG. 11 is a diagram useful in describing the flow of a device manufacturing process.

A process for manufacturing a semiconductor device utilizing the production system set forth above will now be described. FIG. 11 illustrates the overall flow of a process for manufacturing semiconductor devices. The circuit for the device is designed at step 1 (circuit design). A mask on which the designed circuit pattern has been formed is fabricated at step 2 (mask fabrication). Meanwhile, a wafer is manufactured using a material such as silicon or glass at step 3 (wafer manufacture). The actual circuit is formed on the wafer by lithography, using the mask and wafer that have been prepared at step 4 (wafer process), which is also referred to as "pre-treatment". A semiconductor chip is obtained, using the wafer fabricated at step 4, at step 5 (assembly), which is also referred to as "post-treatment". This step includes steps such as actual assembly (dicing and bonding) and packaging (chip encapsulation). The semiconductor device fabricated at step 5 is subjected to inspections such as an operation verification test and a durability test at step 6 (inspection). The semiconductor device is completed through these steps and then is shipped (step 7). The pre- and post-treatments are performed at separate special-purpose plants. Maintenance is carried out on a per-plant basis by the above-described remote maintenance system. Further, information for production management and equipment maintenance is communicated by data communication between the pre- and post-treatment plants via the Internet or leased-line network.

Figure 12:
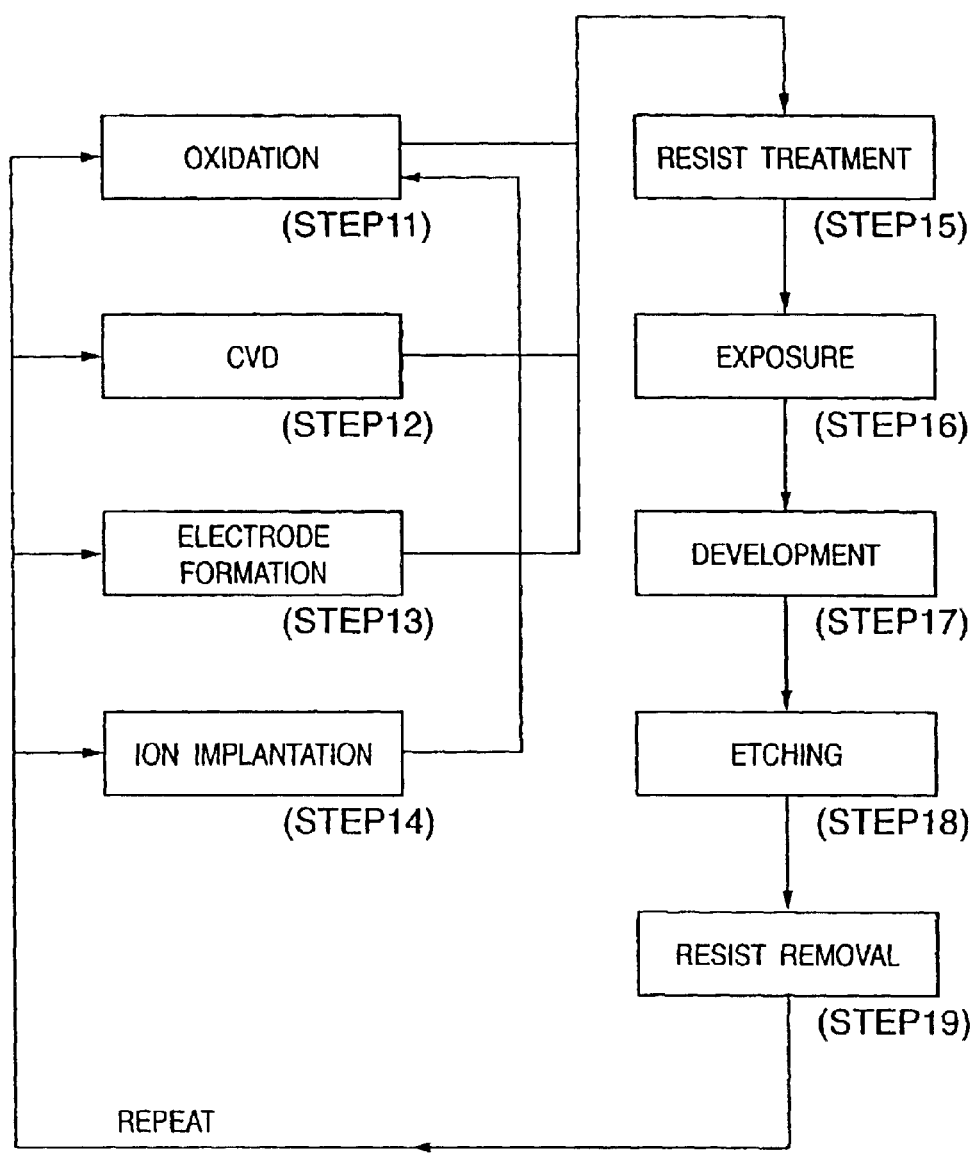
FIG. 12 is a diagram useful in describing a wafer process.

FIG. 12 is a flowchart illustrating the detailed flow of the wafer process mentioned above. The surface of the wafer is oxidized at step 11 (oxidation). An insulating film is formed on the wafer surface at step 12 (CVD), electrodes are formed on the wafer by vapor deposition at step 13 (electrode formation), and ions are implanted in the wafer at step 14 (ion implantation). The wafer is coated with a photoresist at step 15 (resist treatment), the wafer is exposed to the circuit pattern of the mask to print the pattern onto the wafer by the above-described exposure apparatus at step 16 (exposure), and the exposed wafer is developed at step 17 (development). Portions other than the developed photoresist are etched away at step 18 (etching), and unnecessary resist left after etching is performed is removed at step 19 (resist removal). Multiple circuit patterns are formed on the wafer by implementing these steps repeatedly. Since the manufacturing equipment used at each step is maintained by the remote maintenance system described above, malfunctions can be prevented and quick recovery is possible if a malfunction should happen to occur. As a result, the productivity of semiconductor device manufacture can be improved over the prior art.

Other Embodiments

Furthermore, there are cases wherein the object of the invention is attained also by supplying a software program (e.g., the position measuring method of the present invention), which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program. Accordingly, since the functions of the present invention are implemented by a computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or print data supplied to an operating system, etc., does not matter.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, a DVD (DVD-ROM, DVD-R), etc.

As for the method of supplying the program, the client computer can be connected to a Web page on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different Web pages. In other words, a WWW (World Wide Web) server that downloads, to multiple users, the program files that implement the functions of the present invention by computer also is covered by the claims of the present invention.

Further, it is also possible to store the program of the present invention on a storage medium such as a CD-ROM upon encrypting the program, to distribute the storage medium to users, to allow users who meet certain requirements to download decryption key information from a Web page via the Internet, and to allow these users to run the encrypted program by using the key information, whereby the program is installed in the user computer.

Furthermore, besides the case wherein the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The present invention is not limited to the above embodiments and various changes and modifications can be made within the spirit and scope of the present invention. Therefore, to apprise the public of the scope of the present invention, the following claims are made.

What is claimed is:

1. A position measuring apparatus which measures positions of first and second marks, said apparatus comprising:

a detection system which detects an image of the first and second marks;

an image processing system which processes the image of the first and second marks; and a control system which controls said detection system and said image processing system so as to obtain first and second images, of which signal intensities are adjusted with respect to the first and second marks, respectively, the first image being obtained by accumulating an image signal more than the second image.

2. An apparatus according to claim 1, wherein said detection system includes an illuminating system with a dimmer, which illuminates the first and second marks.

3. An apparatus according to claim 1, wherein a plurality of images of the first and second marks detected by said detection system are added by said image processing system under a control by said control system.

4. An apparatus according to claim 3, wherein a number of the plurality of images, which are added, is determined based on signal intensities with respect to the first and second marks of an image detected by said detection system.

5. An apparatus according to claim 3, wherein a number of the plurality of images, which are added, is determined based on a signal intensity with respect to one of the first and second marks of an image obtained by the image addition by said image processing system.

6. An apparatus according to claim 1, wherein a storage time during which said detection system stores an image signal is changed under a control by said control unit.

7. An apparatus according to claim 6, wherein the storage time is changed based on signal intensities with respect to the first and second marks of an image detected by said detection system.

8. An apparatus according to claim 1, wherein the first and second marks are formed on objects to be aligned.

9. An apparatus according to claim 1, wherein one of the first and second marks is formed in said detection system.

10. An apparatus according to claim 1, wherein the positions of the first and second marks are obtained based on the first and second images.

11. An apparatus according to claim 1, further comprising an exposure system which exposes a substrate to a pattern, wherein the first mark is related to a position of the substrate.

12. An apparatus according to claim 1, further comprising an exposure system which has a projection optical system and projects a pattern onto a substrate through said projection optical system, wherein an image of the first mark is detected by said detection system through said projection optical system.

13. A device manufacturing method comprising:
a step of exposing a substrate to a pattern using a position measuring apparatus defined in claim 11.

14. A device manufacturing method comprising:
a step of exposing a substrate to a pattern using a position measuring apparatus defined in claim 12.

15. A position measuring method of measuring positions of first and second marks, said method comprising steps of:
detecting an image of the first and second marks;
processing the image of the first and second marks; and
controlling said detecting step and said image processing step so as to obtain first and second images, of which signal intensities are adjusted with respect to the first and second marks, respectively, the first image being obtained by accumulating an image signal more than the second image.

16. An exposure apparatus comprising:
a projection optical system for projecting a pattern of a mask onto a substrate;
a stage which holds the substrate;
a detection system which detects an image of a first mark formed on said stage and a second mark formed on the mask, wherein said detection system detects light from the first mark through said projection optical system; and
a control system which controls said detection system so as to obtain a first image for detecting a position of the first mark and a second image for detecting a position of the second mark, with a storage time of said detection system for the first image longer than that for the second image.

17. A device manufacturing method comprising steps of:
exposing a substrate to a pattern using an exposure apparatus as recited in claim 16; and
developing the exposed substrate.

18. An exposure apparatus comprising:
a projection optical system for projecting a pattern of a mask onto a substrate;
a detection system which detects an image of a first mark formed on the substrate and a second mark arranged in said detection system, wherein said detection system detects light from the first mark through said projection optical system; and
a control system which controls said detection system so as to obtain a first image for detecting a position of the first mark and a second image for detecting a position of the second mark, with a storage time of said detection system for the first image longer than that for the second image.

19. A device manufacturing method comprising steps of:
exposing a substrate to a pattern using an exposure apparatus as recited in claim 18; and
developing the exposed substrate.

20. An exposure apparatus which projects a pattern of a mask onto a substrate, said apparatus comprising:
a detection system which has an optical element and detects an image of a first mark formed on the substrate and a second mark arranged in said detection system, wherein said detection system detects light from the first mark through said optical element; and
a control system which controls said detection system so as to obtain a first image for detecting a position of the first mark and a second image for detecting a position of the second mark, with a storage time of said detection system for the first image longer than that for the second image.

21. A device manufacturing method comprising steps of:
exposing a substrate to a pattern using an exposure apparatus as recited in claim 20; and
developing the exposed substrate.

22. An exposure apparatus comprising:
a projection optical system for projecting a pattern of a mask onto a substrate;
a stage which holds the substrate;
a detection system which detects an image of a first mark formed on said stage and a second mark formed on the mask, wherein said detection system detects light from the first mark through said projection optical system;
an image processing system which accumulates images obtained by said detection system; and a control system which controls said detection system and said image processing system so as to obtain a first image for detecting a position of the first mark and a second image for detecting a position of the second mark, with a number of accumulated images by said image processing system for the first image being more than that for the second image.

23. A device manufacturing method comprising steps of:

exposing a substrate to a pattern using an exposure apparatus as recited in claim 22; and developing the exposed substrate.

24. An exposure apparatus comprising;

a projection optical system for projecting a pattern of a mask onto a substrate;

a detection system which detects an image of a first mark formed on the substrate and a second mark arranged in said detection system, wherein said detection system detects light from the first mark through said projection optical system;

an image processing system which accumulates images obtained by said detection system; and a control system which controls said detection system and said image processing system so as to obtain a first image for detecting a position of the first mark and a second image for detecting a position of the second mark, with a number of accumulated images by said image processing system for the first image being more than that for the second image.

25. A device manufacturing method comprising steps of:

exposing a substrate to a pattern using an exposure apparatus as recited in claim 24; and developing the exposed substrate.

26. An exposure apparatus which projects a pattern of a mask onto a substrate, said apparatus comprising:

a detection system which has an optical element and detects an image of a first mark formed on the substrate and a second mark arranged in said detection system, wherein said detection system detects light from the first mark through said optical element;

an image processing system which accumulates images obtained by said detection system; and a control system which controls said detection system and said image processing system so as to obtain a first image for detecting a position of the first mark and a second image for detecting a position of the second mark, with a number of accumulated images by said image processing system for the first image being more than that for the second image.

27. A device manufacturing method comprising steps of:

exposing a substrate to a pattern using an exposure apparatus as recited in claim 26; and developing the exposed substrate.

28. An exposure method of projecting a pattern of a mask onto a substrate through a projection optical system, said method comprising steps of:

detecting an image of a first mark formed on a stage for holding the substrate and a second mark formed on the mask using a detector, wherein light from the first mark is detected through the projection optical system; and controlling said detection step so as to obtain a first image for detecting a position of the first mark and a second image for detecting a position of the second mark, with a storage time of the detector for the first image longer than that for the second image.

29. An exposure method of projecting a pattern of a mask onto a substrate through a projection optical system, said method comprising steps of:

detecting, using a detection system, an image of a first mark formed on the substrate and a second mark arranged in said detection system, wherein light from the first mark is detected through the projection optical system; and controlling said detection step so as to obtain a first image for detecting a postion of the first mark and a second image for detecting a position of the second mark, with a storage time of the detection system for the first image longer than that for the second image.

30. An exposure method of projecting a pattern of a mask onto a substrate, said method comprising steps of:

detecting and using a detection system which has an optical element, an image of a first mark formed on the substrate and a second mark arranged in said detection system, wherein light from the first mark is detected through said optical element; and controlling said detection step so as to obtain a first image for detecting a position of the first mark and a second image for detecting a position of the second mark, with a storage time of the detection system for the first image longer than that for the second image.

31. An exposure method of projecting a pattern of a mask onto a substrate through a projection optical system, said method comprising steps of:

detecting an image of a first mark formed on a stage for holding the substrate and a second mark formed on the mask using a detector, wherein light from the first mark is detected through the projection optical system;

accumulating images obtained in said detection step; and controlling said detection step and said accumulation step so as to obtain a first image for detecting a position of the first mark and a second image for detecting a position of the second mark, with a number of accumulated images in said accumulating step for the first image being more than that for the second image.

32. An exposure method of projecting a pattern of a mask onto a substrate through a projection optical system, said method comprising steps of:

detecting, using a detection system, an image of a first mark formed on the substrate and a second mark arranged in said detection system, wherein light from the first mark is detected through the projection optical system;

accumulating images obtained in said detection system; and controlling said detection step and said accumulation step so as to obtain a first image for detecting a position of the first mark and a second image for detecting a position of the second mark, with a number of accumulated images in said accumulation step for the first image being more than that for the second image.

33. An exposure method of projecting a pattern of a mask onto a substrate, said method comprising steps of:

detecting and using a detection system which has an optical element, an image of a first mark formed on the substrate and a second mark arranged in said detection system, wherein light from the first mark is detected through said optical element;

accumulating images obtained in said detection step; and controlling said detection step and said accumulation step so as to obtain a first image for detecting a position of the first mark and a second image for detecting a position of the second mark, with a number of accumulated images in said accumulation step for the first image being more than that for the second image.

34. An exposure apparatus which projects a pattern of a mask onto a substrate, said apparatus comprising:

a detection system which has an optical element and detects an image of first and second marks for aligning the substrate and the mask, wherein said optical element is arranged between the first and second marks, and said detection system detects light from the first mark through said optical element;

an image processing system which processes the image of the first and second marks; and a control system which controls said detection system and said image processing system so as to obtain first and second images, of which signal intensities are adjusted with respect to the first and second marks, respectively, the first image being obtained by accumulating more image signals than the second image.

35. A device manufacturing method comprising steps of:

exposing a substrate to a pattern using an exposure apparatus as recited in claim 34; and developing the exposed substrate.

36. An exposure method of projecting a pattern of a mask onto a substrate, said method comprising steps of:

detecting an image of first and second marks for aligning the substrate and the mask, wherein an optical element is arranged between the first and second marks, and light from the first mark is detected through the optical element;

processing the image of the first and second marks; and controlling said detection step and said image processing step so as to obtain first and second images, of which signal intensities are adjusted with respect to the first and second marks, respectively, the first image being obtained by accumulating more image signals than the second image.

* * * * *

UNITED STATES PATENT AND TRADEMARK OFFICE
CERTIFICATE OF CORRECTION

PATENT NO. : 6,897,938 B2
DATED : May 24, 2005
INVENTOR(S) : Hiroshi Tanaka et al.

It is certified that error appears in the above-identified patent and that said Letters Patent is hereby corrected as shown below:

Column 1,
Line 24, "had" should read -- made --.
Line 41, "modem" should read -- modern --.

Column 5,
Line 50, "an other" should read -- another --.

Column 9,
Line 60, "had" should read -- made --.

Column 10,
Line 31, "had" should read -- made --.
Line 32, "the of" should read -- that of --.

Column 18,
Line 10, "postion" should read -- position --.

Signed and Sealed this

Twenty-seventh Day of September, 2005

JON W. DUDAS
*Director of the United States Patent and Trademark Office*